(12) United States Patent
Chakraborty et al.

(10) Patent No.: US 11,897,234 B2
(45) Date of Patent: Feb. 13, 2024

(54) COMPOSITE MATERIALS FOR DAMPING ACOUSTIC VIBRATIONS

(71) Applicant: UNIVERSITY OF LIMERICK, Limerick (IE)

(72) Inventors: Souvik Chakraborty, Goslar (DE); Mark Simms, Ballymore Eustace (IE); Ioannis Manolakis, Sligo (IE); Ananda Roy, Edinburgh (GB)

(73) Assignee: THE UNIVERSITY OF LIMERICK, Limerick (IE)

( * ) Notice: Subject to any disclaimer, the term of this patent is extended or adjusted under 35 U.S.C. 154(b) by 10 days.

(21) Appl. No.: 17/755,073

(22) PCT Filed: Oct. 14, 2020

(86) PCT No.: PCT/EP2020/078888
§ 371 (c)(1),
(2) Date: Apr. 20, 2022

(87) PCT Pub. No.: WO2021/078603
PCT Pub. Date: Apr. 29, 2021

(65) Prior Publication Data
US 2022/0388284 A1 Dec. 8, 2022

(30) Foreign Application Priority Data
Oct. 24, 2019 (GB) ...................... 1915453

(51) Int. Cl.
*B32B 27/18* (2006.01)
*B32B 25/08* (2006.01)
(Continued)

(52) U.S. Cl.
CPC ................ *B32B 25/08* (2013.01); *B32B 5/18* (2013.01); *B32B 5/32* (2013.01); *B32B 7/12* (2013.01);
(Continued)

(58) Field of Classification Search
CPC ............... B05B 1/3436; B05B 11/1025; B05B 11/1047; B05B 11/1074; B05B 11/00;
(Continued)

(56) References Cited

U.S. PATENT DOCUMENTS

2013/0045369 A1    2/2013   Takemura et al.

FOREIGN PATENT DOCUMENTS

CN   202293483 U    7/2012
CN   106142781 A    11/2016
(Continued)

OTHER PUBLICATIONS

PCT International Search Report and Written Opinion for International Application No. PCT/EP2020/078888, dated Jan. 29, 2021, 9 pages.

*Primary Examiner* — Lawrence D Ferguson
(74) *Attorney, Agent, or Firm* — Hoffman Warnick LLC

(57) ABSTRACT

An article for damping vibrations by constrained layer damping comprising: a first constraining layer; a second constraining layer; and a damping layer disposed between the first and second constraining layers, wherein the first and second constraining layers each independently comprise a fibre-reinforced composite material, wherein the first and second constraining layers each independently have a thickness from 1.5 to 5 mm, wherein the damping layer comprises a viscoelastic material, wherein the damping layer has a thickness from 1 to 10 mm and wherein the article has a thickness from 6 to 50 mm. The invention also relates to the use of said article for damping vibrations in a vehicle.

19 Claims, 1 Drawing Sheet

(51) Int. Cl.
  B32B 5/18   (2006.01)
  B32B 5/32   (2006.01)
  B32B 7/12   (2006.01)
  B32B 25/14  (2006.01)
  B32B 27/30  (2006.01)
  B32B 27/38  (2006.01)
  B29C 70/44  (2006.01)

(52) U.S. Cl.
  CPC .............. *B32B 25/14* (2013.01); *B32B 27/18* (2013.01); *B32B 27/308* (2013.01); *B32B 27/38* (2013.01); *B29C 70/443* (2013.01); B32B 2260/02 (2013.01); B32B 2260/04 (2013.01); B32B 2262/101 (2013.01); B32B 2262/106 (2013.01); B32B 2262/14 (2013.01); B32B 2266/025 (2013.01); B32B 2266/0235 (2013.01); B32B 2266/0264 (2013.01); B32B 2266/0278 (2013.01); B32B 2266/06 (2013.01); B32B 2266/08 (2013.01); B32B 2270/00 (2013.01); B32B 2307/102 (2013.01); B32B 2307/3065 (2013.01); B32B 2307/732 (2013.01); B32B 2319/00 (2013.01); B32B 2323/04 (2013.01); B32B 2323/10 (2013.01); B32B 2327/06 (2013.01); B32B 2363/00 (2013.01); B32B 2367/00 (2013.01); B32B 2375/00 (2013.01); B32B 2605/00 (2013.01)

(58) Field of Classification Search
  CPC .............. B29C 70/443; B32B 2260/02; B32B 2260/021; B32B 2260/04; B32B 2260/046; B32B 2262/101; B32B 2262/106; B32B 2262/14; B32B 2264/10; B32B 2266/0235; B32B 2266/025; B32B 2266/0264; B32B 2266/0278; B32B 2266/06; B32B 2266/08; B32B 2270/00; B32B 2307/102; B32B 2307/3065; B32B 2307/56; B32B 2307/718; B32B 2307/732; B32B 2319/00; B32B 2323/04; B32B 2323/10; B32B 2327/06; B32B 2363/00; B32B 2367/00; B32B 2375/00; B32B 25/08; B32B 25/10; B32B 25/14; B32B 2605/00; B32B 2605/08; B32B 27/08; B32B 27/18; B32B 27/20; B32B 27/308; B32B 27/38; B32B 5/022; B32B 5/024; B32B 5/18; B32B 5/32; B32B 7/022; B32B 7/12; F16F 15/04; F16F 2224/0225; F16F 2224/0241; F16F 2232/08; F16F 2234/06; F16F 2236/10
  See application file for complete search history.

(56) References Cited

FOREIGN PATENT DOCUMENTS

| | | |
|---|---|---|
| CN | 107804046 A | 3/2018 |
| CN | 207274047 U | 4/2018 |
| CN | 208410951 U | 1/2019 |
| CN | 208771557 U | 4/2019 |
| JP | 2000043173 A | 2/2000 |
| JP | 2004291408 A | 10/2004 |
| JP | 2006192629 A | 7/2006 |
| WO | 2011108677 A1 | 9/2011 |

COMPOSITE MATERIALS FOR DAMPING ACOUSTIC VIBRATIONS

FIELD

The present invention relates to articles for damping vibrations, such as acoustic vibrations, the articles comprising a first constraining layer, a second constraining layer, and a damping layer disposed between the first and second constraining layers. In particular, the present invention relates to said articles for damping vibrations, such as acoustic vibrations, in a vehicle, such as an automotive vehicle. The invention also extends to the use of said articles for damping vibrations, such as acoustic vibrations, in particular, in a vehicle, such as an automotive vehicle.

BACKGROUND

Materials for damping acoustic vibrations are used widely in the automotive industry to reduce noise from, for example, road noise and/or engine noise. Typically, damping materials comprise a viscoelastic material. Energy, e.g. vibrational energy, is dissipated in the viscoelastic material, typically through shear strain converting to heat energy, resulting in a 'damping' of the vibrations. This damping of vibrations results in acoustic quieting (i.e. a reduction of noise).

There are two main types of applied acoustic damping: free layer damping or constrained layer damping.

In free layer damping, a damping material is attached to the surface of a base structure, which is typically a metal sheet. Energy is dissipated as a result of extension and compression of the damping material when the base structure bends and/or flexes during vibration.

In constrained layer damping, a damping material is sandwiched between two stiff sheets that do not themselves have damping properties. The two sheets are commonly referred to as constraining layers. Typically, the sheets are made from metal, such as aluminium, or plywood. Energy is dissipated as a result of shear deformation of the damping material when the stiff sheets bend and/or flex during vibration. Thus, energy is trapped and dissipated in the damping material (as a result of shear deformation).

Body and/or floor panels of automotive vehicles, such as motor vehicles, typically require constrained layer damping. Typically, a damping material is placed between the body and/or floor panel and a constraining layer made from metal or plywood. A 'damping patch' comprising the damping material and the constraining layer is attached, typically by an adhesive, to the body and/or floor panel of the automotive vehicle. The body and/or floor panel and constraining layer both act as a constraining layer and acoustic damping is achieved by constrained layer damping as described above.

In alternative systems known in the art, a damping material is sandwiched between two wooden panels, typically made from plywood, and the layered structure is attached, typically by an adhesive, to the body and/or floor panel of an automotive vehicle.

However, articles for damping acoustic vibrations having constraining layers made from wood or metal do not have high structural or mechanical integrity.

It is an object of the present invention to provide one or more solutions to one of the above mentioned or other problems.

SUMMARY

According to a first aspect of the present invention there is provided an article for damping vibrations by constrained layer damping comprising:

a first constraining layer,
a second constraining layer, and
a damping layer disposed between the first and second constraining layers,
wherein the first and second constraining layers each independently comprise a fibre-reinforced composite material; wherein the first and second constraining layers each independently have a thickness from 1.5 to 5 mm; wherein the damping layer comprises a viscoelastic material; wherein the damping layer has a thickness from 1 to 10 mm; and wherein the article has a thickness from 6 to 50 mm.

Advantageously, the article of the present invention typically has a lower thickness compared to materials for damping acoustic vibrations known in the art. Advantageously, the article of the present invention reduces vibrations, such as acoustic vibrations, whilst also being suitable for use directly as a body and/or floor panel of a vehicle. Advantageously, the article of the present invention may have improved structural and mechanical performance than would typically be expected for materials for damping acoustic vibrations known in the art, whilst maintaining acoustic performance. Advantageously, the improved structural and mechanical performance of the article of the present invention may mean that it has improved durability compared to materials for damping acoustic vibrations known in the art.

The first and second constraining layers each independently comprise a fibre-reinforced composite material. For the avoidance of doubt, by 'composite material', and like terms, as used herein is meant a material that is made from two or more constituent materials. As such, the composite materials of the present invention comprise a fibre and at least one other material.

The first and second constraining layers may each independently comprise any suitable fibre-reinforced material. Suitable fibre-reinforced materials will be known to a person skilled in the art. Without being bound by theory, advantageously, the use of fibre-reinforced composite materials, coupled with a suitably stiff joining interface, provides sufficient shear modulus to ensure that shear strains are effectively transferred into the damping layer during vibration.

The first and second constraining layers may each independently comprise one or more fibre(s) and a polymer composition.

The fibres may be any suitable fibres. Suitable fibres will be known to a person skilled in the art. Examples of suitable fibres include, but are not limited to, one or more of the following: glass fibres; carbon fibres; aramid fibres; polymeric fibres; basalt fibres, natural fibres such as, for example, those deriving from the banana plant, jute, hemp, kenaf, flax and/or nutshell; and combinations thereof. The fibres may be in the form a fibre fabric.

Preferably, the fibres may comprise carbon fibre, glass fibre or combinations thereof.

More preferably, the fibres may comprise glass fibre.

Advantageously, the use of glass fibres provides a good balance between cost and performance, such as structural and mechanical rigidity, of the final fibre-reinforced composite material.

Thus, preferably, the fibre-reinforced composite material may comprise carbon fibre, glass fibre or combinations thereof.

Thus, more preferably, the fibre-reinforced composite material may comprise glass fibre.

The polymer composition suitably comprises a polymer (or 'resin'). For the avoidance of doubt, the terms 'polymer' and 'resin' may be used interchangeably herein. The polymer may be any suitable polymer. Suitable polymers will be known to a person skilled in the art. Examples of suitable polymers include, but are not limited to, one or more of the following: epoxy resins; vinyl resins, such as vinyl ester resins; urethane acrylate resins; acrylic resins; polyester resins; polyurethane resins; polyamide resins; phenolic resins; polyvinyl chloride (PVC) resins; alkyd resins; silicone resins; and combinations thereof.

Preferably, the polymer composition may comprise an epoxy resin, a urethane acrylate resin or combinations thereof.

More preferably, the polymer composition may comprise a urethane acrylate resin.

Advantageously, the use of a urethane acrylate resin provides a good balance between cost and performance, such as structural and mechanical rigidity, of the final fibre-reinforced composite material.

Thus, preferably, the fibre-reinforced composite material may comprise an epoxy resin, a urethane acrylate resin or combinations thereof.

Thus, more preferably, the fibre-reinforced composite material may comprise a urethane acrylate resin.

The polymer may comprise a thermosetting or thermoplastic resin.

Preferably, the polymer composition may comprise a thermosetting resin. More preferably, the polymer composition may comprise a thermosetting epoxy resin, a urethane acrylate resin or combinations thereof. Most preferably, the polymer composition may comprise a urethane acrylate resin.

The polymer composition may optionally further comprise one or more crosslinking agents. The crosslinking agent may be any suitable crosslinking agent. Suitable crosslinking agents will be known to a person skilled in the art. Examples of suitable crosslinking agents include, but are not limited to, one of more of the following: phenolic resins (or phenol-formaldehyde resins); aminoplast resins (or triazine-formaldehyde resins); amino resins; epoxy resins; isocyanate resins; beta-hydroxy (alkyl) amide resins; alkylated carbamate resins; polyacids; anhydrides; organometallic acid-functional materials; polyamines; polyamides and combinations thereof.

Non-limiting examples of phenolic resins are those formed from the reaction of a phenol with formaldehyde. Non-limiting examples of phenols which may be used to form phenolic resins are phenol, butyl phenol, xylenol and cresol. General preparation of phenolic resins is described in "The Chemistry and Application of Phenolic Resins or Phenoplasts", Vol V, Part I, edited by Dr Oldring; John Wiley and Sons/Cita Technology Limited, London, 1997.

Non-limiting examples of aminoplast resins include those which are formed from the reaction of a triazine such as melamine or benzoguanamine with formaldehyde. The resultant compounds may be etherified with an alcohol such as methanol, ethanol, butanol or combinations thereof. The preparation and use of aminoplast resins is described in "The Chemistry and Applications of Amino Crosslinking Agents or Aminoplast", Vol V, Part II, page 21 ff., edited by Dr Oldring; John Wiley and Sons/Cita Technology Limited, London, 1998.

The polymer composition may optionally further comprise a catalyst. Any catalyst typically used to catalyse crosslinking reactions between the polymer of the polymer composition and the crosslinking agent may be used. Suitable catalysts will be well known to the person skilled in the art. Suitable catalysts include, but are not limited to one or more of the following: phosphoric acid; alkyl aryl sulphonic acids such as dodecyl benzene sulphonic acid; methane sulphonic acid; para-toluene sulphonic acid; dinonyl naphthalene disulphonic acid; phenyl phosphinic acid and combinations thereof.

The polymer composition may optionally further comprise one or more suitable additives. Suitable additives will be known to a person skilled in the art. Suitable additives include, but are not limited to, one or more of the following: pigments; diluents; fillers; organic solvents; plasticisers; foaming agents; and combinations thereof.

The polymer composition is suitably cured to form a polymer matrix (comprising the fibres as hereinbefore described therein). Suitably, the polymer composition is relatively soft and viscous and the polymer matrix is relatively hard and rigid. The polymer composition may be cured by any suitable method. Suitable methods of curing will be known to a person skilled in the art. For example, the polymer composition may be cured chemically and/or thermally. Preferably, the polymer composition may be cured thermally.

The fibre-reinforced composite material may comprise any suitable amount of fibres. The fibre-reinforced material may comprise from 1 to 80 wt %, such as from 1 to 70 wt %, such as from 1 to 60 wt %, such as from 10 to 60 wt %, or even from 20 to 60 wt % of fibres based on the total solid weight of the fibre-reinforced composite material.

Preferably, the fibre-reinforced material may comprise from 40 to 60 wt % of fibres based on the total solid weight of the fibre-reinforced composite material.

The fibre-reinforced composite material may comprise any suitable amount of the polymer composition. The fibre-reinforced material may comprise from 20 to 99 wt %, such as from 30 to 99 wt %, such as from 40 to 99 wt %, such as from 40 to 90 wt %, or even from 40 to 80 wt % of the polymer composition based on the total solid weight of the fibre-reinforced composite material.

Preferably, the one or more fibre(s) may comprise glass fibres and the polymer composition may comprise an epoxy resin.

Thus, preferably, the fibre-reinforced composite material may comprise a glass-fibre reinforced epoxy resin.

The first and second constraining layers may be formed from the same fibre-reinforced composite material or may be formed from different fibre-reinforced composite materials.

Preferably, the first and second constraining layers may be formed from the same fibre-reinforced composite material.

The first constraining layer has a thickness from 1.5 to 5 mm. The first constraining layer may have a thickness up to up to 4 mm. The first constraining layer may have a thickness of at least 2 mm, such as at least 2.5 mm.

The first constraining layer may have a thickness from 1.5 to 4 mm, such as from 2 to 4 mm, or even from 2.5 to 4 mm. The first constraining layer may have a thickness from 2 to 5 mm, such as from 2.5 to 5 mm.

Preferably, the first constraining layer may have a thickness from 2 to 4 mm.

The second constraining layer has a thickness from 1.5 to 5 mm. The second constraining layer may have a thickness up to 4 mm. The second constraining layer may have a thickness of at least 2 mm, such as at least 2.5 mm.

The second constraining layer may have a thickness from 1.5 to 4 mm, such as from 2 to 4 mm, or even from 2.5 to 4 mm. The second constraining layer may have a thickness from 2 to 5 mm, such as from 2.5 to 5 mm.

Preferably, the second constraining layer may have a thickness from 2 to 4 mm.

The first and second constraining layers may have substantially the same thickness or may have different thicknesses. Preferably, the first and second constraining layers may have substantially the same thickness. By 'substantially the same thickness' is meant that the thickness of the first and second constraining layers is within 10% of each other (i.e. if the first constraining layer is 2 mm, the second constraining layer may be between 1.8 and 2.2 mm, or if the first constraining layer is 4 mm, the second constraining layer may be between 3.6 and 4.4 mm).

The first and second damping layers each independently have a thickness from 1.5 to 5 mm.

Preferably, the first and second damping layers may each independently have a thickness from 2 to 4 mm.

The first and/or second constraining layers may be formed by any suitable method. Suitable methods will be known to a person skilled in the art. For example, the first and/or second constraining layers may be formed by a resin infusion method, such as a vacuum-assisted resin infusion method. In a resin infusion method, one or more fibre(s) are suitably infused with a polymer composition and the polymer composition may be cured to form a fibre-reinforced composite material.

The damping layer comprises a viscoelastic material. The damping layer may comprise any suitable viscoelastic material. Suitable viscoelastic materials will be known to a person skilled in the art. Examples of suitable viscoelastic materials include, but are not limited to, one or more of the following: cork; rubber materials, such as, for example, polybutadiene rubber, styrene-butadiene rubber, butyl rubber, silicone rubber, ethylene propylene diene (EPDM), ethylene propylene rubber (EPR), natural gum, isoprene rubber, nitrile rubber, including, for example, acrylonitrile-butadiene, epichlorohydrin rubber and/or chlorosulphonated polyethylene; elastomer materials, such as thermoplastic elastomer (TPE); resins, such as, for example, epoxy resins including those based on bisphenol A (BPA), vinyl resins, such as, for example, vinyl ester resins, acrylic resins, polyester resins, urethane acrylate resins, polyurethane resins, polyether resins, polyamide resins, phenolic resins, polyvinyl chloride (PVC) resins, alkyd resins and/or silicone resins; bitumen materials such as, for example, standard bitumen, bitumen mastic and/or sprayable bituminous damper; and combinations thereof.

Preferably, the viscoelastic material may comprise a resin.

The resin may be thermosetting or thermoplastic. Preferably, the resin may be thermoplastic. Thus, preferably, the viscoelastic material may comprise a thermoplastic resin.

Preferably, the viscoelastic material may comprise a resin, such as a thermoplastic resin, an elastomer material or combinations thereof.

More preferably, the viscoelastic material may comprise a resin, such as a thermoplastic resin, and an elastomer material.

Thus, preferably, the damping layer may comprise a resin.

Thus, preferably, the damping layer may comprise a resin, such as a thermoplastic resin, an elastomer material or combinations thereof.

Thus, more preferably, the damping layer may comprise a resin, such as a thermoplastic resin, and an elastomer material.

Preferably, the viscoelastic material may comprise a resin, such as a thermoplastic resin, and a rubber.

More preferably, the viscoelastic material may comprise a thermoplastic resin and an ethylene propylene rubber (EPR).

Thus, preferably, the damping layer may comprise a resin, such as a thermoplastic resin, and a rubber.

Thus, more preferably, the damping layer may comprise a thermoplastic resin and an ethylene propylene rubber (EPR Preferably, when the viscoelastic material is a rubber material, the rubber material may comprise butyl rubber, polybutadiene rubber and/or styrene-butadiene rubber.

By "bitumen", and like terms, as used herein is meant bitumen or modified bitumen that is adapted to have the desired damping properties and therefore includes bitumen materials with suitable additives, such as fillers and/or polymeric modifiers. The term "bitumen" therefore includes polymer-modified bitumen.

The viscoelastic material may further comprise a plasticiser. The viscoelastic material may comprise any suitable plasticiser. Examples of suitable plasticisers include, for example, diisononyl phlithate, bis(2-ethylhexyl) phthalate, bis(2-propylheptyl) phthalate, di-n-butyl phthalate, butyl benzyl phthalate, diisodecyl phthalate, dioctyl phthalate, diisooctyl phthalate, diethyl phthalate, diisobutyl phthalate, di-n-hexyl phthalate, trimethyl trimellitate, tri-(2-ethylhexyl) trimellitate, tri-(n-octyl,n-decyl) trimellitate, tri-(heptyl,nonyl) trimellitate, n-octyl trimellitate, bis(2-ethylhexyl) adipate, dimethyl adipate, monomethyl adipate, dioctyl adipate, dibutyl sebacate, dibutyl maleate, diisobutyl maleate, dioctyl terephthalate (commercially available from Eastman Chemical Company), 1,2-cyclohexane dicarboxylic acid diisononyl ester (commercially available from BASF), N-ethyl toluene sulphonamide, N-(2-hydroxypropyl) benzene sulphonamide, N-(n-butyl) benzene sulphonamide, tricresyl phosphate, tributyl phosphate, triethylene glycol dihexanoate, tetraethylene glycol diheptanoate, polymeric plasticisers, polybutene and combinations thereof. It will be appreciated by a person skilled in the art that the use of a plasticiser may provide the viscoelastic material, and thus the damping layer, with improved viscoelasticity by, for example, improving flexibility and reducing brittleness.

The viscoelastic material may further comprise one or more crosslinking agents. Typically, the viscoelastic material may further comprise one or more crosslinking agents when said viscoelastic material comprises a resin (or polymer). Suitable crosslinking agents for the viscoelastic material are as defined above in relation to the polymer composition of the composite material of the first and/or second constraining layers.

The viscoelastic material may further comprise one or more suitable additive(s). Suitable additives will be known to a person skilled in the art. Suitable additives include, but are not limited to, one or more of the following: pigments; diluents; fillers; organic solvents; plasticisers; foaming agents; and combinations thereof.

Preferably, the viscoelastic material may further comprise a filler. Suitable fillers will be known to a person skilled in the art. Suitable fillers include, but are not limited to, one or more of the following: minerals, such as naturally occurring minerals and clay; and combinations thereof.

Preferably, the viscoelastic material may comprise a resin, such as a thermoplastic resin, and a filler, such as a naturally occurring mineral.

Preferably, the viscoelastic material may comprise a resin, such as a thermoplastic resin, an elastomer material, a filler, such as a naturally occurring mineral, or combinations thereof.

More preferably, the viscoelastic material may comprise a resin, such as a thermoplastic resin, an elastomer material and a filler, such as a naturally occurring mineral.

Thus, preferably, the damping layer may comprise a resin, such as a thermoplastic resin, and a filler, such as a naturally occurring mineral.

Thus, preferably, the damping layer may comprise a resin, such as a thermoplastic resin, an elastomer material, a filler, such as a naturally occurring mineral, or combinations thereof.

Thus, more preferably, the damping layer may comprise a resin, such as a thermoplastic resin, an elastomer material and a filler, such as a naturally occurring mineral.

Preferably, the viscoelastic material may comprise a resin, such as a thermoplastic resin, a rubber, such as an ethylene propylene rubber (EPR), and a filler, such as a naturally occurring mineral.

More preferably, the viscoelastic material may comprise a thermoplastic resin, an ethylene propylene rubber (EPR) and a filler comprising a naturally occurring mineral.

Thus, preferably, the damping layer may comprise a resin, such as a thermoplastic resin, a rubber, such as an ethylene propylene rubber (EPR), and a filler, such as a naturally occurring mineral.

Thus, more preferably, the damping ayer may comprise a thermoplastic resin, an ethylene propylene rubber (EPR) and a filler comprising a naturally occurring mineral.

The damping layer may comprise a commercially available viscoelastic material.

The damping layer may have any suitable mass per unit area. The damping layer may have a mass per unit area of up to 10,000 $g/m^2$, such as up to 9,000 $g/m^2$, such as up to 8,000 $g/m^2$, such as up to 7,000 $g/m^2$, such as up to 6,000 $g/m^2$, 5,000 $g/m^2$, such as up to 4,500 $g/m^2$ or even up to 4,000 $g/m^2$. The damping layer may have a mass per unit area of at least 500 $g/m^2$, such as at least 1,000 $g/m^2$, such as at least 1,500 $g/m^2$, such as at least 2,000 $g/m^2$, or even at least 2,500 $g/m^2$.

The damping layer may have a mass per unit area from 500 to 10,000 $g/m^2$, such as from 1,000 to 10,000 $g/m^2$, such as from 1,500 to 10,000 $g/m^2$, such as 2,000 to 10,000 $g/m^2$, or even from 2,500 to 10,000 $g/m^2$. The damping layer may have a mass per unit area from 500 to 9,000 $g/m^2$, such as from 1,000 to 9,000 $g/m^2$, such as from 1,500 to 9,000 $g/m^2$, such as 2,000 to 9,000 $g/m^2$, or even from 2,500 to 9,000 $g/m^2$. The damping layer may have a mass per unit area from 500 to 8,000 $g/m^2$, such as from 1,000 to 8,000 $g/m^2$, such as from 1,500 to 8,000 $g/m^2$, such as 2,000 to 8,000 $g/m^2$, or even from 2,500 to 8,000 $g/m^2$. The damping layer may have a mass per unit area from 500 to 7,000 $g/m^2$, such as from 1,000 to 7,000 $g/m^2$, such as from 1,500 to 7,000 $g/m^2$, such as 2,000 to 7,000 $g/m^2$, or even from 2,500 to 7,000 $g/m^2$. The damping layer may have a mass per unit area from 500 to 6,000 $g/m^2$, such as from 1,000 to 6,000 $g/m^2$, such as from 1,500 to 6,000 $g/m^2$, such as 2,000 to 6,000 $g/m^2$, or even from 2,500 to 6,000 $g/m^2$. The damping layer may have a mass per unit area from 500 to 5,000 $g/m^2$, such as from 1,000 to 5,000 $g/m^2$, such as from 1,500 to 5,000 $g/m^2$, such as 2,000 to 5,000 $g/m^2$, or even from 2,500 to 5,000 $g/m^2$. The damping layer may have a mass per unit area from 500 to 4,500 $g/m^2$, such as from 1,000 to 4,500 $g/m^2$, such as from 1,500 to 4,500 $g/m^2$, such as 2,000 to 4,500 $g/m^2$, or even from 2,500 to 4,500 $g/m^2$. The damping layer may have a mass per unit area from 500 to 4,000 $g/m^2$, such as from 1,000 to 4,000 $g/m^2$, such as from 1,500 to 4,000 $g/m^2$, such as 2,000 to 4,000 $g/m^2$, or even from 2,500 to 4,000 $g/m^2$.

It will be appreciated by a person skilled in the art that the mass per unit area of the damping layer typically depends upon the thickness of said damping layer.

The damping layer has a thickness from 1 to 10 mm. The damping layer may have a thickness up to 7 mm, such as up to 8 mm, such as up to 7 mm, such as up to 6 mm, such as up to 5 mm, such as up to 4 mm, or even up to 3 mm. The damping layer may have a thickness of at least 1 mm, such as at least 1.5 mm, such as at least 2 mm, or even at least 2.5 mm.

The damping layer may have a thickness from 1 to 9 mm, such as from 1 to 8 mm, such as from 1 to 8 mm, such as from 1 to 7 mm, such as from 1 to 5 mm, such as from 1 to 4 mm, or even from 1 to 3 mm. The damping layer may have a thickness from 1.5 to 10 mm, such as 1.5 to 9 mm, such as from 1.5 to 8 mm, such as from 1.5 to 8 mm, such as from 1.5 to 7 mm, such as from 1.5 to 5 mm, such as from 1.5 to 4 mm, or even from 1.5 to 3 mm. The damping layer may have a thickness from 2 to 10 m, such as from 2 to 9 mm, such as from 2 to 8 mm, such as from 2 to 8 mm, such as from 2 to 7 mm, such as from 2 to 5 mm, such as from 2 to 4 mm, or even from 2 to 3 mm. The damping layer may have a thickness from 2.5 to 10 mm, such as from 2.5 to 9 mm, such as from 2.5 to 8 mm, such as from 2.5 to 8 mm, such as from 2.5 to 7 mm, such as from 2.5 to 5 mm, such as from 2.5 to 4 mm, or even from 2.5 to 3 mm.

Preferably, the damping layer may have a thickness of up to 5 mm.

More preferably, the damping layer may have a thickness from 1.5 to 5 mm

More preferably, the damping layer may have a thickness from 2 to 4 mm.

Most preferably, the damping layer may have a thickness from 2 to 3 mm.

The first constraining layer, second constraining layer and damping layer may have each independently have any suitable rigidity. It will be appreciated by a person skilled in the art that each of the first and second constraining layers suitably have sufficient rigidity to enable the article to dampen vibrations, such as acoustic vibrations, by constrained layer damping.

Preferably, the damping layer is less rigid than each of the first and/or second constraining layers. Thus, preferably, the damping layer comprises a material that is less rigid that the material from which each of the first and/or second constraining layers are independently formed. As such, the damping layer may comprise a material which has a modulus of elasticity which is less than the modulus of elasticity of the material from which the first and/or second constraining layers are independently formed. The damping layer may comprise a material which has a modulus of elasticity which is at least an order of magnitude, such as at least several orders of magnitude, less than the modulus of elasticity of the material from which the first and/or second constraining layers are independently formed.

Advantageously, the use of a damping material which comprises a material that is less rigid than the material from which the first and/or second constraining layers are independently formed means that the article has a higher degree of acoustic damping than would typically be expected. Advantageously, the use of constraining layers that are formed from a material that is more rigid than the material from which the damping layer is formed means that the constraining layers are able to transfer most of the induced shear energy into the damping layer during vibration, thus improving dissipation of vibrational energy.

The article has a thickness from 6 to 50 millimetres (mm). The article may have a thickness of up to 45 mm, such as up to 40 mm, such as up to 35 mm, such as up to 30 mm, such a up to 25 mm, such as up to 20 mm, such as up to 18 mm, such as up to 15 mm, such as up to 14 mm, such as up to 13 mm, such as up to 12 mm, such as up to 11 mm, such as up to 10 mm, or even up to 9 mm. The article may have a thickness of at least 7 mm, such as at least 7.5 mm, or even at least 8 mm.

The article may have a thickness from 6 to 45 mm, such as from 6 to 40 mm, such as from 6 to 35 mm, such as from 6 to 30 mm, such as from 6 to 25 mm, such as from 6 to 20 mm, such as from 6 to 18 mm, such as from 6 to 15 mm, such as from 6 to 14 mm, such as from 6 to 13 mm, such as from 6 to 12 mm, such as from 6 to 11 mm, such as from 6 to 10 mm, or even from 6 to 9 mm. The article may have a thickness from 7 to 50 mm, such as from 7 to 45 mm, such as from 7 to 40 mm, such as from 7 to 35 mm, such as from 7 to 30 mm, such as from 7 to 25 mm, such as from 7 to 20 mm, such as from 7 to 18 mm, such as from 7 to 15 mm, such as from 7 to 14 mm, such as from 7 to 13 mm, such as from 7 to 12 mm, such as from 7 to 11 mm, such as from 7 to 10 mm, or even from 7 to 9 mm. The article may have a thickness from 7.5 to 50 mm, such as from 7.5 to 45 mm, such as from 7.5 to 40 mm, such as from 7.5 to 35 mm, such as from 7.5 to 30 mm, such as from 7.5 to 25 mm, such as from 7.5 to 20 mm, such as from 7.5 to 18 mm, such as from 7.5 to 15 mm, such as from 7.5 to 14 mm, such as from 7.5 to 13 mm, such as from 7.5 to 12 mm, such as from 7.5 to 11 mm, such as from 7.5 to 10 mm, or even from 7.5 to 9 mm. The article may have a thickness from 6 to 50 mm, such as from 8 to 45 mm, such as from 8 to 40 mm, such as from 8 to 35 mm, such as from 8 to 30 mm, such as from 8 to 25 mm, such as from 8 to 20 mm, such as from 8 to 18 mm, such as from 8 to 15 mm, such as from 8 to 14 mm, such as from 8 to 13 mm, such as from 8 to 12 mm, such as from 8 to 11 mm, such as from 8 to 10 mm, or even from 8 to 9 mm.

Preferably, the article may have a thickness of up to 15 mm.

More preferably, the article may have a thickness of up to 12 mm.

Most preferably, the article may have a thickness of up to 10 mm.

Preferably, the article may have a thickness from 6 to 15 mm.

More preferably, the article may have a thickness from 6 to 12 mm.

Most preferably, the article may have a thickness from 6 to 10 mm.

Advantageously, the use of an article having a thickness from 6 to 10 mm provides an article having good balance between structural and mechanical strength, damping efficiency and weight.

Advantageously, the use of an article having a thickness from 6 to 10 mm, means that the article is a suitable thickness to be used directly as a body and/or floor panel of a vehicle. The article of the present invention provides sufficient damping properties whilst also providing sufficient structural and mechanical properties, such that said article may advantageously be used directly as a body and/or floor panel of a vehicle. Advantageously, being able to use the article of the present invention directly as a body and/or floor panel of a vehicle simplifies and/or reduces assembly steps.

Each of the first constraining layer, second constraining layer and/or the damping layer may independently be fire retardant. Preferably, each of the first constraining layer, second constraining layer and/or the damping layer may be fire retardant.

The article may optionally comprise one or more further layer(s).

The article may optionally comprise one or more further foam layer(s). The foam layers, when present, may comprise any suitable foam materials. Suitable foam materials will be well known to a person skilled in the art. Suitable examples of foam materials include, but are not limited to, one or more of the following: polymethacrylimide (PMI) foam; polyethylene terephthalate (PET) foam; polyurethane foam; polyethylene foam; polypropylene foam; polyvinyl chloride foam (PVC); and combinations thereof.

The foam layer, when present, may comprise a closed cell or an open cell foam.

Preferably, the foam layer, when present, may be fire retardant.

The article may further comprise a thermal layer. The thermal layer, when present, may comprise any suitable thermal material. Suitable thermal materials will be well known to a person skilled in the art. Suitable examples of thermal materials include, but are not limited to, one or more of the following: foams, such as open or closed cell foams; foils; and combinations thereof.

The further layers, such as foam layer(s) and/or thermal layer(s), when present, may be disposed on any suitable surface of the article. For example, the further layers, when present, may be disposed between the first constraining layer and the damping layer, between the second constraining layer and the damping layer, or may be disposed on the outer surface of the first and/or second constraining layer.

Preferably, the foam layer, when present, may be disposed between the first constraining layer and the damping layer or may be disposed between the second constraining layer and the damping layer.

Preferably, the thermal layer, when present may be disposed on the outer surface of the first and/or second constraining layer. For the avoidance of doubt, when the foam layer and/or thermal layer is disposed on the outer surface of the first and/or second constraining layer, the total thickness of the article as defined herein does not include the foam layer and/or thermal layer, i.e. includes only the first and/or second constraining layers and layers disposed therebetween. For the avoidance of doubt, when the foam layer and/or thermal layer is disposed between the first and/or second constraining layer and the damping layer, the total thickness of the article as defined herein includes the foam layer and/or thermal layer, i.e. such that it includes the first and/or second constraining layers and layers disposed therebetween.

The article may further comprise one of more adhesive layer(s). For example, the article may comprise one or more adhesive layers disposed between adjacent layers of the article. Suitable adhesives will be well known to a person skilled in the art. Suitable adhesives include, but are not limited to, one or more of the following: natural adhesives; synthetic adhesives; pressure adhesives; contact adhesives, such as contact spray adhesives; hot melt adhesives; anaerobic adhesives; acrylic adhesives; polyurethane adhesives; epoxy adhesives; and combinations thereof.

In certain embodiments, the article may consist essentially of a first constraining layer, a second constraining layer, a damping layer disposed between the first and second constraining layers, optionally one or more adhesive layers disposed between adjacent layers of the article, optionally one or more foam layer(s) and optionally or one or more thermal layer(s).

In certain embodiments, the article may consist essentially of a first constraining layer, a second constraining layer, a damping layer disposed between the first and second constraining layers and, optionally, one or more adhesive layers disposed between adjacent layers of the article.

In certain alternative embodiments, the article may consist essentially of a first constraining layer, a second constraining layer and a damping layer disposed between the first and second constraining layers.

The article may have any suitable damping loss factor at 100 Hz. The article may have a damping loss factor of at least 5%, such as at least 6%, such as at least 7%, such as at least 8%, such as at least 9%, such as at least 10%, such as at least 11%, such as at least 12%, such as at least 13%, such as at least 14%, or even at least 15% at 100 Hz.

The article may have any suitable damping loss factor at 200 Hz. The article may have a damping loss factor of at least 5%, such as at least 6%, such as at least 7%, such as at least 8%, such as at least 9%, such as at least 10%, such as at least 11%, such as at least 12%, such as at least 13%, such as at least 14%, or even at least 15% at 200 Hz.

The article may have any suitable damping loss factor at 300 Hz. The article may have a damping loss factor of at least 4%, such as at least 5%, such as at least 6%, such as at least 7%, such as at least 8%, such as at least 9%, such as at least 10%, such as at least 11%, such as at least 12%, such as at least 13%, such as at least 14%, or even at least 15% at 300 Hz.

The article may have any suitable damping loss factor at 400 Hz. The article may have a damping loss factor of at least 3%, such as at least 4%, such as at least 5%, such as at least 6%, such as at least 7%, such as at least 8%, such as at least 9%, such as at least 10%, such as at least 11%, such as at least 12%, such as at least 13%, such as at least 14%, or even at least 15% at 400 Hz.

The damping loss factor may be measured by any suitable method. Suitable methods will be known to a person skilled in the art. Suitably, the damping loss factor is measured using a modified version of the cantilever Oberst beam method, as described in ASTM E756 ('Standard Test Method for Measuring Vibration—Damping Properties of Materials'). In such a method, a sample having a width of 50 mm is clamped into a heavy, rigid holder leaving a free length of 200 to 300 mm. A vibration accelerometer (used as a response transducer) is affixed to the free end of the sample with adhesive. A force hammer is used as an exciter and used at 45 mm intervals along the centre line axis of the sample. The sample is measured with different free lengths of 200 mm, 230 mm and 300 mm and the modes of the sample determined in a frequency range of 0 to 400 Hz. The damping loss of the material is determined at each mode as a percentage. All values for damping loss factor as reported herein were measured in this way unless specified otherwise.

The article according to the present invention may be produced by any suitable method. Suitable methods will be known to a person skilled in the art. For example, the article may be produced by attaching the components of the article, such as the first constraining layer, second constraining layer and/or damping layer, together, for example, with a suitable adhesive (with the proviso that the damping layer is disposed between the first and second constraining layers). For example, the first and/or second constraining layers may be produced by a resin infusion method, such as a vacuum-assisted resin infusion method, and may subsequently be attached to the damping layer, for example, with a suitable adhesive (with the proviso that the damping layer is disposed between the first and second constraining layers).

When the first and/or second constraining layers may be produced by a resin infusion method, such as a vacuum-assisted resin infusion method, the method for producing the article may comprise the following steps:
  (i) providing a first and second constraining layer each independently produced by a method comprising the steps of:
    (I) providing one or more fibre(s);
    (II) infusing the one or more fibres(s) with a polymer composition; and
    (III) curing said polymer composition to form a fibre-reinforced composite material;
  (ii) providing a damping layer having a first and second surface; and
  (iii) attaching the first and second constraining layers as formed in step (i) to each of the first and second surfaces of said damping layer, for example, with a suitable adhesive.

Preferably, step (II) may be performed under vacuum. Advantageously, performing step (II) under vacuum may mean that lower temperatures than would typically be expected can be used during the process, thus reducing manufacturing costs In an alternative embodiment, the (whole) article may be produced by a resin infusion method, such as a vacuum-assisted resin infusion method.

When the article is produced by a resin infusion method, the method for producing the article may comprise the following steps:
  (i) providing a damping layer having a first and second surface;
  (ii) disposing one or more fibre(s) on the first and second surfaces of said damping layer;
  (iii) infusing the damping layer and/or one or more fibre(s) with a polymer composition; and
  (iv) curing said polymer composition to form a fibre-reinforced composite material.

Thus, according to a second aspect of the present invention there is provided a method of producing an article for damping vibrations by constrained layer damping, the article comprising:
  a first constraining layer,
  a second constraining layer, and
  a damping layer disposed between the first and second constraining layers,
  wherein the first and second constraining layers each independently comprise a fibre-reinforced composite material comprising one or more fibre(s) and a polymer composition; wherein the first and second constraining layers each independently have a thickness from 1.5 to 5 mm; wherein the damping layer comprises a viscoelastic material; wherein the damping layer has a thickness from 1 to 10 mm; and wherein the article has a thickness from 6 to 50 mm; wherein the method comprises the step of:
  (i) providing the damping layer, said damping layer having a first and second surface;
  (ii) disposing one or more fibre(s) on the first and second surfaces of said damping layer;
  (iii) infusing the damping layer and/or one or more fibre(s) with a polymer composition; and
  (iv) curing said polymer composition to form the fibre-reinforced composite material of the first and second composite layers.

Preferred features of the second aspect of the present invention as defined above in relation to the first aspect of the present invention.

Preferably, step (iii) may be performed under vacuum. Thus, preferably, the article may be formed by a vacuum-assisted resin infusion method. Advantageously, the use of a vacuum-assisted resin infusion method may mean that lower temperatures than would typically be expected can be used during the process, thus reducing manufacturing costs.

The one or more fibre(s) may be disposed in the form of substantially individual fibres or in the form of a pre-woven fibre material. Suitably, the one or more fibre(s) may be disposed in the form of a pre-woven fibre material.

The article according to the present invention is preferably used in a vehicle to dampen vibrations, such as acoustic vibrations including structure-borne noise within a panel, in said vehicle. Preferably, the article is a body and/or floor panel of a vehicle.

Thus, according to a third aspect of the present invention there is provided a vehicle, the vehicle comprising an article according to the first aspect of the present invention.

Preferred features of the third aspect of the present invention are as defined above in relation to the first and/or second aspects of the present invention.

The vehicle may be any suitable vehicle. The vehicle may be an automotive vehicle, such as, for example, a car, van, lorry, coach, minibus or bus, an agricultural vehicle, such as a tractor, a train or an aerospace vehicle, such as, for example, an aeroplane or helicopter.

Preferably, the vehicle may be an automotive vehicle.

The article may be attached to a body and/or floor panel of the vehicle or may itself be used as a body and/or floor panel of a vehicle.

In certain embodiments, the first and/or second constraining layer may be a body and/or floor panel of a vehicle. For the avoidance of doubt, when the first and/or second constraining layer is a body and/or floor panel of a vehicle, the damping layer and the other of the first and/or second constraining layer may be provided separately and attached to the body and/or floor panel of the vehicle such that said body and/or floor panel becomes the first and/or second constraining layer. In this arrangement, the damping layer and the other of the first and/or second constraining layer are not part of the body and/or floor panel itself and are attached additionally thereto.

Preferably, the article may itself be used as a body and/or floor panel of a vehicle.

For the avoidance of doubt, when the article is itself used at a body and/or floor panel of a vehicle, the whole article, i.e. the first constraining layer, the second constraining layer, the damping layer and optional further layers, form the body and/or floor panel of the vehicle.

Thus, according to a fourth aspect of the present invention there is provided a vehicle, the vehicle comprising an article according to the first aspect of the present invention, wherein the article is a body and/or floor panel of said vehicle.

Preferred features of the fourth aspect of the present invention are as defined above in relation to the first, second and/or third aspects of the present invention.

The article may be used as any suitable body and/or floor panel of a vehicle. For example, when the vehicle is an automotive vehicle, the article may be used as a door panel, a floor panel, a hood, a boot, a bumper end, a fender, a wheel arch panel, a cabin bulkhead or a combination thereof.

Preferably, when the vehicle is an automotive vehicle, the article may be used as a door panel, a floor panel or a combination thereof.

More preferably, when the article is an automotive vehicle, the article may be used a floor panel.

As described above, the article according to the present invention may be used for damping vibrations, preferably for damping vibrations in a vehicle.

Thus, according to a fifth aspect of the present invention there is provided the use of the article according to the first aspect of the present invention for damping vibrations.

According to a sixth aspect of the present invention there is provided the use of the article according to the first aspect of the present invention for damping vibrations in a vehicle.

According to a seventh aspect of the present invention, there is provided a method for damping vibrations, such as acoustic vibrations, in a body and/or floor panel of a vehicle, the method comprising attaching an article according to the first aspect of the present invention to said body and/or floor panel.

According to an eighth aspect of the present invention, there is provided a method for damping vibrations, such as acoustic vibrations, in a vehicle, the method comprising providing a panel formed at least in part from an article according to the first aspect of the present invention and using said panel as a body and/or floor panel of the vehicle.

Preferred features of the fifth, sixth, seventh and/or eighth aspects of the present invention are as defined above in relation to the first, second, third and/or fourth aspects of the present invention.

It will be appreciated by a person skilled in the art that providing a body and/or floor panel in the eighth aspect of the present invention and attaching said body and/or floor panel to a vehicle means that said body and/or floor panel is used directly as a body and/or floor panel and/or floor in said vehicle and is not attached to another body and/or floor panel of the vehicle.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein.

Singular encompasses plural and vice versa. For example, although reference is made herein to "a" damping layer, "a" polymer composition, "a" resin, "a" fibre-reinforced composite material, "a" viscoelastic material, and the like, one or more of each of these and any other components can be used.

As used herein, the term "polymer" refers to oligomers and both homopolymers and copolymers, and the prefix "poly" refers to two or more. Including, for example and like terms means including for example but not limited to. Additionally, although the present invention has been described in terms of "comprising", the articles, materials, methods and compositions detailed herein may also be described as "consisting essentially of" or "consisting of".

All of the features contained herein may be combined with any of the above aspects and in any combination.

BRIEF DESCRIPTION OF DRAWINGS

For a better understanding of the invention, and to show how embodiments of the same may be carried into effect, reference will now be made, by way of example only, to the accompanying drawings, in which.

DESCRIPTION OF EMBODIMENTS

Figure 1:
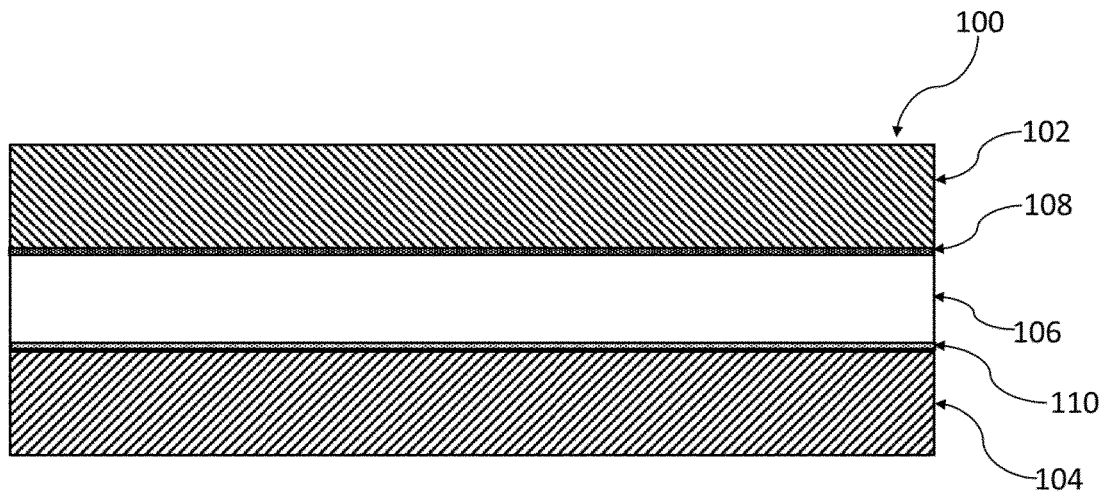
FIG. 1 shows a schematic and cross-sectional view of an article for damping vibrations according to an exemplary embodiment of the present invention.

FIG. 1 shows an article (100) for damping vibrations. The article (100) comprises a first constraining layer (102), a second constraining layer (104) and a damping layer (106) disposed between the first constraining layer (102) and the second constraining layer (104). The first constraining layer (102) is attached to the damping layer (106) via a first adhesive layer (108). The second constraining layer (104) is attached to the damping layer (106) via a second adhesive layer (110) The first constraining layer (102) is formed from a glass fibre-reinforced composite material wherein the composition resin is a urethane acrylate resin and has a thickness of 2.7 mm. The second constraining layer (104) is also formed from a glass fibre-reinforced composite material wherein the composition resin is a urethane acrylate resin and also has a thickness of 2.7 mm. The damping layer (106) is formed from a viscoelastic material containing a thermoplastic resin, an elastomer and a filler and has a high degree of intrinsic damping. The damping layer (106) has a thickness of 2.7 mm. The article (100) has an overall thickness of 8.1 mm.

The article (100) may be used directly as a body and/or floor panel of an automotive vehicle (not shown).

The article (100; 'example 1') was tested for damping loss factor against a plywood panel having a thickness of 15 mm ('comparative example 1') and a plywood/cork/plywood damping article known in the art and having an overall thickness of 15 mm ('comparative example 2'). The damping loss factor was measured according to the following test method:

Damping loss factor: the damping loss factor was measured according using a modified version of the cantilever Oberst beam method, as described in ASTM E756 ('Standard Test Method for Measuring Vibration—Damping Properties of Materials'). The sample had a width of 50 mm and was clamped into a heavy, rigid holder leaving a free length of 200 to 300 mm. A vibration accelerometer (used as a response transducer) was affixed to the free end of the sample with adhesive. A force hammer was used as an exciter and used at 45 mm intervals along the centre line axis of the sample. The sample was measured with different free lengths of 200 mm, 230 mm and 300 mm and the modes of the sample determined in a frequency range of 0 to 400 Hz. The damping loss of the material was determined at each mode as a percentage.

Figure 2:
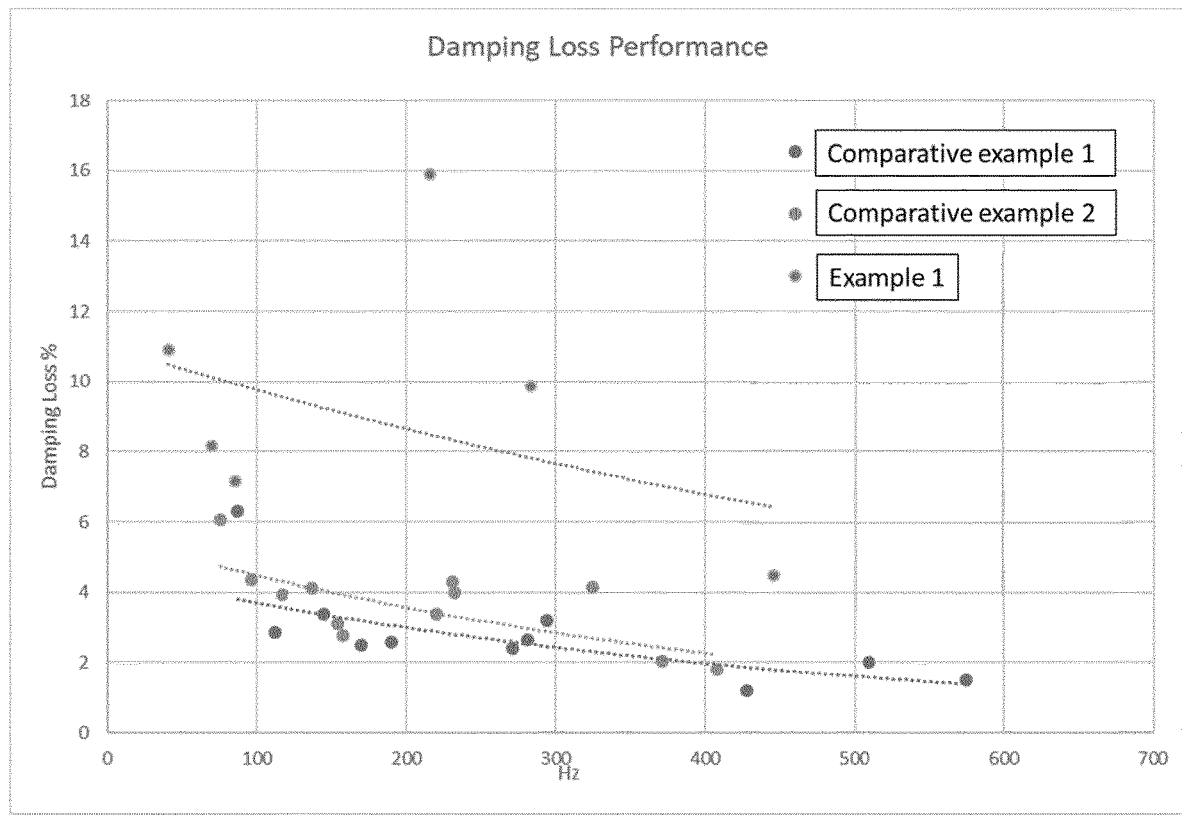
FIG. 2 shows a graph showing the damping loss of the article shown in FIG. 1 and a damping article known from the art.

The results are shown in FIG. 2. For the avoidance of doubt, in FIG. 2, example 1 is the article according to the invention and as shown in FIG. 1. Comparative example 1 is a plywood panel and comparative example 2 is a plywood/cork/plywood damping article known in the art.

FIG. 2 shows that the article of the present invention has improved damping loss factor compared to the comparative articles.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An article for damping vibrations by constrained layer damping comprising:
a first constraining layer,
a second constraining layer, and
a damping layer disposed between the first and second constraining layers,
wherein the first and second constraining layers each independently comprise a fibre-reinforced composite material;
wherein the first and second constraining layers each independently have a thickness from 1.5 to 5 mm;
wherein the damping layer comprises a viscoelastic material;
wherein the damping layer has a thickness from 1 to 10 mm; and
wherein the article has a thickness from 6 to 50 mm.

2. An article according to claim 1, wherein the article has a thickness of up to 15 mm.

3. An article according to claim 1, wherein the article has a thickness from 6 to 10 mm.

4. An article according to claim 1, wherein the first and second constraining layers each independently have a thickness from 2 to 4 mm.

5. An article according to claim 1, wherein the thicknesses of the first and second constraining layers are within 10% of each other.

6. An article according to claim 1, wherein the damping layer has a thickness from 1.5 to 5 mm, such as from 2 to 4 mm.

7. An article according to claim 1, wherein the fibre-reinforced composite material comprises carbon fibre, glass fibre or combinations thereof.

8. An article according to claim 1, wherein the fibre-reinforced composite material comprises an epoxy resin, a urethane acrylate resin or combinations thereof.

9. An article according to claim 1, wherein the viscoelastic material comprises a thermoplastic resin.

10. An article according to claim 9, wherein the viscoelastic material comprises a thermoplastic resin, a rubber, such as an ethylene propylene rubber (EPR).

11. An article according to claim 1, wherein the article further comprises one or more foam layer(s) and/or one or more thermal layer(s).

12. An article according to claim 1, wherein the article further comprises one of more adhesive layer(s).

13. An article according to claim 1, wherein the article has a thickness from 6 to 20 mm and consists essentially of a first constraining layer, a second constraining layer, and a damping layer disposed between the first and second constraining layers.

14. An article according to claim 1, wherein the article consists essentially of a first constraining layer, a second constraining layer, a damping layer disposed between the first and second constraining layers, and one or more adhesive layers disposed between adjacent layers of the article.

15. An article according to claim 14, wherein the article is a body and/or floor panel of a vehicle.

16. A method of producing an article for damping vibrations by constrained layer damping, the article comprising:
- a first constraining layer,
- a second constraining layer, and
- a damping layer disposed between the first and second constraining layers,
- wherein the first and second constraining layers each independently comprise a fibre-reinforced composite material comprising one or more fibre(s) and a polymer composition;
- wherein the first and second constraining layers each independently have a thickness from 1.5 to 5 mm;
- wherein the damping layer comprises a viscoelastic material; wherein the damping layer has a thickness from 1 to 10 mm; and
- wherein the article has a thickness from 6 to 50 mm;

wherein the method comprises the step of:
- (i) providing the damping layer, said damping layer having a first and second surface;
- (ii) disposing one or more fibre(s) on the first and second surfaces of said damping layer;
- (iii) infusing the damping layer and/or one or more fibre(s) with a polymer composition; and
- (iv) curing said polymer composition to form the fibre-reinforced composite material of the first and second composite layers.

17. A method according to claim 16, wherein step (iii) is performed under vacuum.

18. A vehicle, the vehicle comprising an article according to claim 1.

19. A vehicle according to claim 18, wherein the article is a body and/or floor panel of said vehicle.

\* \* \* \* \*